United States Patent Office 3,087,880
Patented Apr. 30, 1963

3,087,880
METHOD OF MAKING PERMSELECTIVE MEMBRANES
Paul Kollsman, 100 E. 50th St., New York, N.Y.
No Drawing. Original application Apr. 23, 1958, Ser. No. 730,320, now Patent No. 3,075,908, dated Jan. 29, 1963. Divided and this application Sept. 9, 1960, Ser. No. 54,820
6 Claims. (Cl. 204—162)

This invention relates to improvements in the method of making permselective membrances of ion exchange material comprising a matrix of a synthetic resin to which ion exchange groups are fixedly attached.

The invention will be explained by examples of producing a cation membrance and an anion membrance. From the great number of commercially available ion exchange materials Amberlite IR–120 was selected as a component for the cation membrane and Amberlite IRA–400 for the anion membrane.

Amberlite IR–120 is a polystyrene-divinyl benzene copolymer, sulfonated to form a cation exchange resin.

Amberlite IRA–400 is a polystyrene-divinyl benzene copolymer, quaternized in a two-step process to become a strong base type anion exchanger, as known in the art and described, for example, in the Annual Review of Physical Chemistry, vol. 2, pp. 314–315, Stanford, California, 1951.

*Example I.—Cation Membrane*

Amberlite IR–120 of a mean particle size of about 0.1 mm. diameter in air dried condition is combined with polyethylene of a mean particle size of about 0.05 mm. in the proportion of 72 to 28 parts, by weight, and the mixture is placed in a mold and put under pressure of 500 lb. per square inch. The temperature is then gradually increased to a maximum of 150° C. When the temperature of 140° C. is reached the pressure is increased to 2500 lb. per square inch and maintained for about one minute during which time the temperature of 150° C. is reached. The total heating period takes about 5 minutes.

After molding and cooling the membrane surface may be ground with an abrasive to remove any possible polyethylene surface film.

As the membrane comes out of the mold it is dry and is then irradiated to strengthen and stiffen the polyethylene component and render it heat resistant.

Irradiation may be accomplished by X-ray exposure with a dosage of between 1 and 30 million roentgens. Irradiation produces crosslinking and improves the physical characteristics of the membrane.

The membrane may then be installed in a cell or otherwise brought into contact with an electrolyte.

It is generally known that ion exchange materials tend to swell when first contacted by electrolyte. This swelling is controlled and restrained by the increased strength of the irradiated crosslinked material.

*Example II.—Anion Membrane*

For the preparation of the anion membrane Amberlite IRA–400 is substituted for Amberlite IR–120, all other data remaining the same.

*Test.*—An electrodialysis cell was constructed comprising 100 anion and cation membranes of 1 mm. thickness arranged in alternating order between platinum electrodes, resulting in 50 concentration chambers, 49 deionization chambers and 2 electrode chambers.

Sea water was deionized in the apparatus at a temperature of 110° C. and a pressure of 30 lb. per square inch to prevent boiling.

0.51 mg. of salts were removed per watt sec.

This application is a division of copending application Serial No. 730,320, filed April 23, 1958, now Patent No. 3,075,908, which, in turn, is a continuation-in-part of application Serial No. 585,536, filed May 17, 1956, now abandoned.

What is claimed is:

1. In the method of making a membrane of ion exchange material comprising a polyethylene matrix component and an ion exchange compound component and involving the steps of forming a membrane sheet and irradiating the sheet to produce crosslinking of the polyethylene, the sequence of steps characterized by irradiation by crosslinking radiation of the sheet while the sheet is in substantially dry condition followed by exposure of the sheet to an ionic solvent.

2. In the method of making a membrane of ion exchange material comprising a polyethylene matrix component and an ion exchange compound component and involving the steps of forming a membrane sheet and irradiating the sheet to produce crosslinking of the polyethylene, the sequence of steps characterized in that exposure of the sheet to an ionic solvent is preceded by the step of irradiating the sheet by X rays, irradiation taking place while the sheet is in substantially dry condition.

3. In the method of making an ion exchange membrane in which polyethylene forms the matrix and in which the ion exchange portion is of the styrene base type and which involves the step of irradiation to produce crosslinking of the polyethylene of a previously formed membrane sheet, the sequence of steps characterized by irradiation by crosslinking radiation of the sheet while the sheet is in substantially dry condition followed by exposure of the sheet to an ionic solvent.

4. In the method of making a membrane of ion exchange material comprising a polyethylene matrix component and a styrene base ion exchange component, the method involving irradiation of a previously formed membrane sheet composed predominantly of polyethylene and a styrene base ion exchange compound to produce crosslinking of the polyethylene by such irradiation, the sequence of steps characterized by irradiation by crosslinking radiation of the sheet in a substantially dry state followed thereafter by exposure of the irradiated sheet to an ionic liquid.

5. In the method of making an ion exchange membrane in which polyethylene forms the matrix and in which the ion exchange portion is of the styrene base type and which involves the step of irradiation to produce crosslinking of the polyethylene of a previously formed membrane sheet, the sequence of steps characterized by irradiation by X rays of the membrane sheet while the said sheet is in substantially dry condition followed by exposure of the membrane sheet to an ionic solvent.

6. In the method of making a membrane of ion exchange material comprising a polyethylene matrix component and a styrene base ion exchange component, the method involving irradiation of a previously formed membrane sheet composed predominantly of polyethylene and a styrene base ion exchange compound to produce crosslinking of the polyethylene by such irradiation, the sequence of steps characterized by irradiation by X rays of the said sheet in a substantially dry state followed thereafter by exposure of the irradiated membrane sheet to an ionic liquid.

References Cited in the file of this patent

UNITED STATES PATENTS 2,836,553    Guthrie et al. _____ May 27, 1958

OTHER REFERENCES

Lawton et al.: "Nature," vol. 172 (July 11, 1953), pages 76 and 77.

Brookhaven National Laboratory Report, No. 375 (S–28), April 1956, page 26.